US011662806B2

(12) United States Patent
Barak et al.

(10) Patent No.: US 11,662,806 B2
(45) Date of Patent: *May 30, 2023

(54) DEEP PREDICTOR RECURRENT NEURAL NETWORK FOR HEAD POSE PREDICTION

(71) Applicant: Magic Leap, Inc., Plantation, FL (US)

(72) Inventors: Lior Barak, Binyamina (IL); Guy Rosenthal, Tel Aviv (IL); Adi Perry, Tel Aviv (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,857

(22) Filed: Apr. 29, 2022

(65) Prior Publication Data

US 2022/0253133 A1    Aug. 11, 2022

Related U.S. Application Data

(63) Continuation of application No. 17/253,888, filed as application No. PCT/US2019/042846 on Jul. 22, 2019, now Pat. No. 11,320,899.
(Continued)

(51) Int. Cl.
*G06F 3/01* (2006.01)
*G02B 27/00* (2006.01)
(Continued)

(52) U.S. Cl.
CPC ......... *G06F 3/012* (2013.01); *G02B 27/0093* (2013.01); *G02B 27/0172* (2013.01); *G06N 3/049* (2013.01); *G06T 19/006* (2013.01)

(58) Field of Classification Search
CPC .... A63F 13/211; A63F 13/212; A63F 13/428; A63F 13/5255; A63F 13/67;
(Continued)

(56) References Cited

U.S. PATENT DOCUMENTS 6,850,221 B1    2/2005  Tickle
9,442,564 B1    9/2016  Dillon
(Continued)

FOREIGN PATENT DOCUMENTS

WO    WO 2020/023399    1/2020

OTHER PUBLICATIONS

International Search Report and Written Opinion for PCT Application No. PCT/US2019/042846, dated Oct. 2, 2019.
(Continued)

*Primary Examiner* — Nelson M Rosario
(74) *Attorney, Agent, or Firm* — Seed Intellectual Property Law Group LLP

(57) ABSTRACT

Systems and methods for predicting head pose for a rendering engine of an augmented or virtual reality device can include a recurrent neural network (RNN) that accepts a time series of head pose data and outputs a predicted head pose. The recurrent neural network can include one or more long short term memory (LSTM) units or gated recurrent units (GRUs). A fully connected (FC) layer can accept input from the RNN and output a 3 degree-of-freedom (DOF) head pose (e.g., angular orientation or spatial position) or a 6 DOF head pose (e.g., both angular orientation and spatial position). The rendering engine can use the predicted head pose to generate and display virtual content to the user at the time the user looks toward the position of the virtual content, which reduces system latency and improves user experience.

16 Claims, 9 Drawing Sheets

Related U.S. Application Data

(60) Provisional application No. 62/702,309, filed on Jul. 23, 2018.

(51) Int. Cl.
 *G02B 27/01* (2006.01)
 *G06N 3/049* (2023.01)
 *G06T 19/00* (2011.01)

(58) Field of Classification Search
 CPC ............... G02B 27/0093; G02B 27/01; G02B 27/0172; G02B 2027/0185; G06F 1/163; G06F 3/012; G06N 3/049; G06T 19/00; G06T 19/006
 See application file for complete search history.

(56) References Cited

U.S. PATENT DOCUMENTS

| | | |
|---|---|---|
| 10,402,649 B2 | 9/2019 | Rabinovich et al. |
| 10,942,564 B2 | 3/2021 | Young et al. |
| 10,996,742 B2 | 5/2021 | Connellan et al. |
| 11,320,899 B2 | 5/2022 | Barak et al. |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1* | 1/2016 | Bradski ............... H04N 13/128 345/8 |
| 2017/0319123 A1 | 11/2017 | Voss et al. |
| 2018/0018451 A1 | 1/2018 | Spizhevoy et al. |
| 2018/0053056 A1 | 2/2018 | Rabinovich et al. |
| 2018/0053108 A1 | 2/2018 | Olabiyi et al. |
| 2018/0089834 A1 | 3/2018 | Spizhevoy et al. |
| 2018/0137642 A1 | 5/2018 | Malisiewicz et al. |
| 2018/0268220 A1 | 9/2018 | Lee et al. |
| 2018/0357789 A1 | 12/2018 | Yang et al. |
| 2021/0223858 A1 | 7/2021 | Barak |

OTHER PUBLICATIONS

International Preliminary Report on Patentability for PCT Application No. PCT/US2019/042846, dated Jan. 26, 2021.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Belagiannis V. et al., "Recurrent Human Pose Estimation", In Automatic Face & Gesture Recognition; 12th IEEE International Conference—May 2017, ar Xiv:1605.02914v3; (Aug. 5, 2017) Open Access Version in 8 pages.
Bimber, et al., "Spatial Augmented Reality—Merging Real and Virtual Worlds," 2005 https://web.media.mit.edu/~raskar/book/BimberRaskarAugmentedRealityBook.pdf.
Hochreiter et al., "Long Short-Term Memory," Neural computation, 9, 1735-1780, 1997.
Hui, "RNN, LSTM and GRU tutorial," Mar. 15, 2017. https://jhui.github.io/2017/03/15/RNN-LSTM-GRU/.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Karpathy, "The Unreasonable Effectiveness of Recurrent Neural Networks," Hacker's guide to Neural Networks, Andrej Karpathy blog, May 21, 2015. In 39 pages.
Saad, et al., "Predictive head tracking for virtual reality," Neural Networks, 1999. IJCNN '99. International Joint Conference on Washington, DC, Jul. 10-16, 1999. IEEE, vol. 6, Jul. 10, 1999, pp. 3933-3936.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).
Understanding LSTM Networks, Colah's blog, posted Aug. 27, 2015, in 16 pages. Http://colah.github.io/posts/2015-08-Understanding-LSTMs/.
Wikipedia, Recurrent neural network, https://en.wikipedia.org/wiki/Recurrent_neural_network. Jul. 19, 2018. In 16 pages.

\* cited by examiner

US 11,662,806 B2

DEEP PREDICTOR RECURRENT NEURAL NETWORK FOR HEAD POSE PREDICTION

CROSS-REFERENCE TO RELATED APPLICATIONS

This application claims priority to, and is a continuation of, U.S. patent application Ser. No. 17/253,888 titled "DEEP PREDICTOR RECURRENT NEURAL NETWORK FOR HEAD POSE PREDICTION" and filed on Dec. 18, 2020. U.S. patent application Ser. No. 17/253,888 claims the benefit of priority to U.S. Patent Application No. 62/702,309, filed Jul. 23, 2018, entitled "DEEP PREDICTOR RECURRENT NEURAL NETWORK FOR HEAD POSE PREDICTION." Each of the above recited applications are hereby incorporated by reference herein in their entirety.

BACKGROUND

Field

This disclosure generally relates to systems and methods that use recurrent neural networks to predict head pose (e.g., orientation, position, rotation or translation) and more particularly to augmented or virtual reality systems utilizing such recurrent neural networks for head pose prediction.

Description of the Related Art

Modern computing and display technologies have facilitated the development of systems for so called "virtual reality" "augmented reality" or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Systems and methods for predicting head pose for a rendering engine of an augmented or virtual reality device can include a recurrent neural network (RNN) that accepts a time series of head pose data and outputs a predicted head pose (e.g., orientation, position, rotation, or translation). The recurrent neural network can include one or more long short term memory (LSTM) units or gated recurrent units (GRUs). A fully connected (FC) layer can accept input from the RNN and output a 3 degree-of-freedom (DOF) head pose (e.g., angular orientation or spatial position) or a 6 DOF head pose (e.g., both angular orientation and spatial position). The rendering engine can use the predicted head pose to generate and display virtual content to the user at the time the user looks toward the position of the virtual content, which reduces system latency and improves user experience.

In various aspects, a wearable display system includes a display configured to be disposed before an eye of a wearer of the wearable system, the display configured to display virtual content to the wearer of the wearable system; a head pose sensor configured to provide head pose data; non-transitory memory configured to store a head pose prediction recurrent neural network; a hardware processor in communication with the head pose sensor, the display, and the non-transitory memory, the hardware processor programmed to: receive the head pose data; input the head pose data to the head pose prediction recurrent neural network; execute the head pose prediction recurrent neural network to output a predicted head pose at a time horizon; and cause the display to render the virtual content based at least in part on the predicted head pose at the time horizon The recurrent neural network head pose prediction techniques described herein are not limited to AR, MR, or VR applications and can be used for other applications where a person's head pose is desired such as, e.g., gaming, medicine (e.g., neurology, ophthalmic, rehabilitation), etc.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
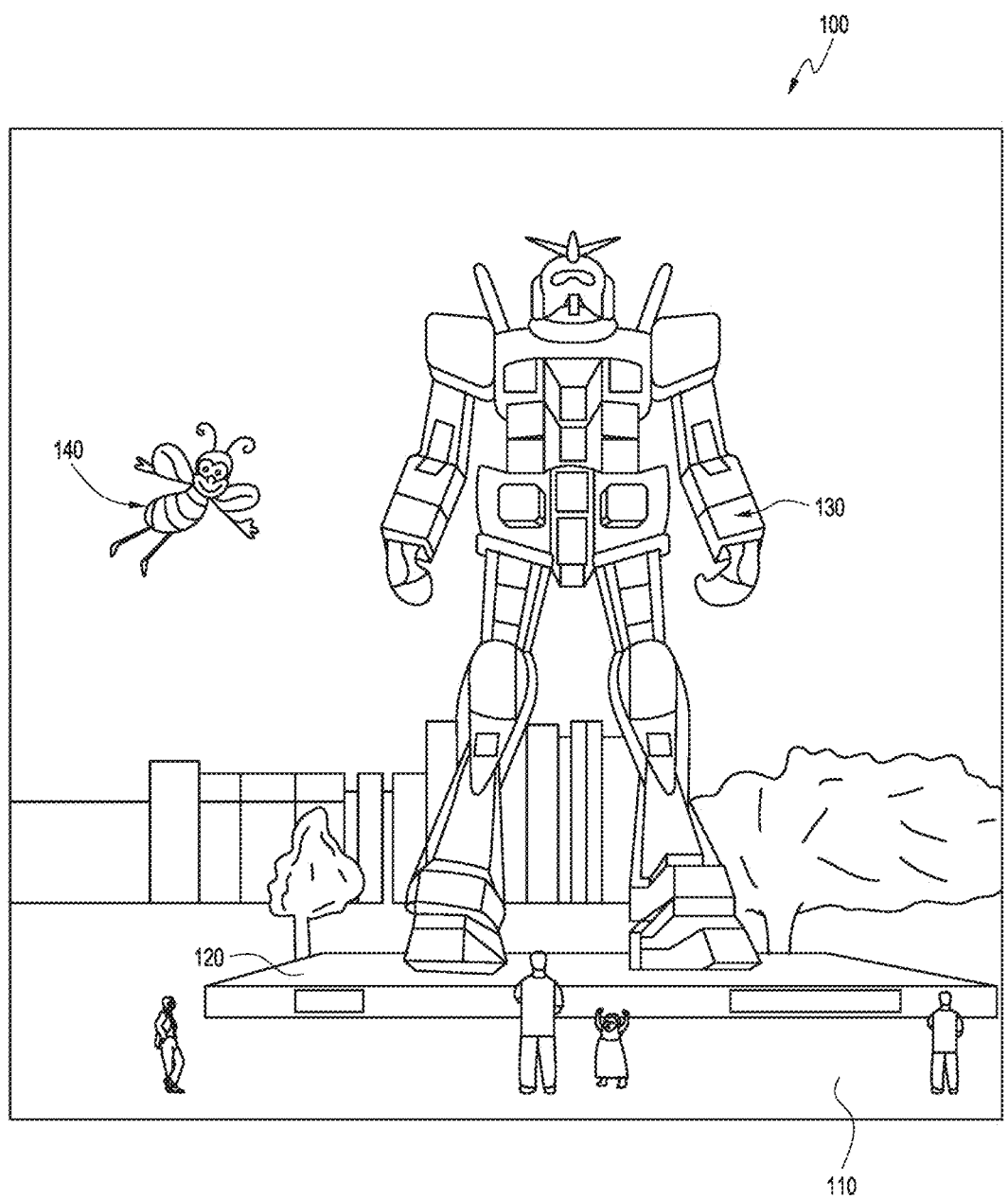
FIG. 1 depicts an illustration of an augmented reality scenario with certain virtual reality objects, and certain physical objects viewed by a person.

AR, MR, or VR wearable systems can render virtual content to the eyes of a user (see, e.g., FIG. 1). There typically will be some degree of rendering latency in the virtual content rendering pipeline, as it takes time to generate renderable content and deliver it to the AR, MR, or VR display. In various AR, MR, VR implementations, the latency time can be in a range from about 10 ms to about 50 ms, e.g., about 30 ms for some wearable systems.

During an AR, MR, or VR experience, a user will move his or her head to look at different portions of the environment around the user, and virtual content will enter and leave the user's field of view (FOV) due to this head motion. The wearable system will render virtual content that is in the FOV for display to the user. However, as the user moves his or her head, the position of currently rendered virtual content may change (e.g., from near the center of the FOV to more peripheral regions of the FOV or vice versa), some virtual content will leave the FOV and will not need to be rendered, and other virtual content that was previously not rendered will enter the user's FOV and will need to be rendered. Accordingly, while in use, the rendered position of virtual content will change with time due to the user's head motion.

In view of the rendering latency period (e.g., 30 ms) taken by wearable system to render virtual content, it can be advantageous for the system to predict where the user will be looking at a future time (comparable to the rendering latency period) to know what virtual content at which the user will be looking at this future time. The system can begin to render the virtual content ahead of this future time (e.g., by a time period comparable to the rendering latency time) so that the virtual content is actually rendered to the user when he or she begins to look at it. In a sense, embodiments of the wearable system can begin to render the virtual content so that it is displayed "just in time" when the user looks at it. Such rendering pipelines can, for example, reduce latency, provide smooth transitions as virtual content moves about in the FOV, or reduce jumpiness of the displayed virtual content, which can beneficially improve the user's AR, MR, or VR experience.

Head pose prediction can use information from a head pose sensor, which may include an accelerometer or a gyroscope or other position or orientation sensor. Head pose can refer to an orientation (e.g., measured by three angles such as yaw, pitch, and roll), a position (e.g., measured by three spatial coordinates such as Cartesian x, y, and z), or both orientation and position. Head movement (e.g., change in head pose) can be measured by changes in orientation (e.g., angular changes), changes in spatial position (e.g., translation), or both. Since the time horizon for predicting future head pose is comparable to the rendering latency (e.g., about 30 ms), some implementations utilize a constant acceleration model to predict future head pose. The constant acceleration model assumes the acceleration of the user's head is approximately constant over the prediction time horizon. The constant acceleration model can use input from the head pose sensor (e.g., an accelerometer or a gyroscope) to measure acceleration. Head pose sensor input may be filtered (e.g., using an extended Kalman filter (EKF)) to provide smoother velocity or acceleration estimates. As a one-dimensional, non-limiting example of constant acceleration prediction, if $\omega$ is the angular rotation rate of the user's head and $\alpha$ is the constant angular acceleration, the change in angular position of the user's head, $\Delta\theta$, over a prediction time period dt is $\Delta\theta = \omega dt + \alpha dt^2/2$. Similar constant acceleration kinematic models can be developed for a change in the user's head position.

Errors in predicted future head pose can arise from errors in the velocity or acceleration used in the prediction model as well as errors in the prediction model itself. For example, real user's heads do not move with constant acceleration, even over relatively short prediction time horizons. It has been found from user measurements, for example, that the root-mean-square (rms) positional error is about 0.6 mm and the 95% quantile (q95) is about 1.5 mm. In these example user measurements, most of the positional error was from errors in the estimated velocity and acceleration (which were obtained from EKF filtering of accelerometer and gyroscope data). The constant acceleration model for head translations may be sufficiently accurate for some wearable systems.

In these example user measurements, the rms angular error was about 1.5 arcminutes and q95 was about 4 arcminutes. However, in contrast to the positional errors, about 30% of the angular error was due to the use of the constant acceleration model. Accordingly, head pose prediction can be improved by utilizing a more robust and accurate angular prediction model than the constant acceleration model.

The present disclosure provides examples of a recurrent neural network (RNN) approach to head pose prediction that can be substantially more accurate than the constant acceleration model. In various embodiments, the recurrent neural network approach can be applied to angular predictions, translation predictions, or both angular and translation predictions for head motion. For example, in some wearable systems and when compared to the constant acceleration model, the recurrent neural network model for angular head pose predictions has been found to reduce rms angular error by 25%, improve angular q95 by about 27%, and overall provide about a 38% improvement in angular prediction (particularly at lower head velocities).

Embodiments of the RNN approach can be trained on actual user head pose data so that the RNN can learn from this data and provide accurate head pose predictions. In contrast to the constant acceleration model (and some other predictive algorithms), the RNN approach does not assume a fixed mathematical model for head pose prediction or make assumptions about head kinematics (e.g., constant acceleration). The RNN can learn from actual user head motion without making assumptions about head motion, which can limit the applicability and accuracy of such fixed models. Moreover, embodiments of the RNN approach can continue to learn from head pose data acquired while the user of the wearable system is moving and interacting with real and virtual content. Thus, such embodiments advantageously can be personalized to reflect the actual characteristics of the user's head motion. Such embodiments can be particularly advantageous in cases where the user has a disability or disease that contributes head motions (e.g., tremors or twitches) that might not be present in a standardized, default population of users.

Additionally, head pose predictions can be influenced by short accelerations (called taps) that may not represent true user head motion but are due to external influences on the wearable system (e.g., an actual physical tap or bump to a head-mounted frame of the wearable system). Such "tapping" can lead to prediction errors in the constant acceleration model, because that model assumes these accelerations represent actual head motion. In contrast, embodiments of the recurrent neural network approach exhibit significant resilience to tapping and smaller rms errors (by about 37%) and q96 quantile (by about 36%).

Accordingly, embodiments of the wearable system that utilize the recurrent neural network techniques described herein can advantageously provide more accurate and more robust head pose predictions, which leads to improved display of virtual content, and an improved AR, MR, or VR experience for the user of the wearable system.

The recurrent neural network head pose prediction techniques described herein are not limited to AR, MR, or VR applications and can be used for other applications where a person's head pose is desired such as, e.g., gaming, medicine (e.g., neurology, ophthalmic, rehabilitation), etc.

Overview of AR and VR

A wearable system (also referred to herein as an augmented reality (AR) system) can be configured to present 2D or 3D virtual images to a user. The images may be still images, frames of a video, or a video, in combination or the like. The wearable system may comprise a wearable device that can present a VR, AR, or MR environment, alone or in combination, for user interaction. The wearable device can include a wearable display device, such as, e.g., a head-mounted display (HMD). The wearable device can also include a beltpack which may comprise a central processing unit to handle some of the data processing for the wearable device, a battery, etc. In some situations, the wearable device can be used in interchangeably with an augmented reality device (ARD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he or she "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Example AR and VR Systems and Components

Figure 2:
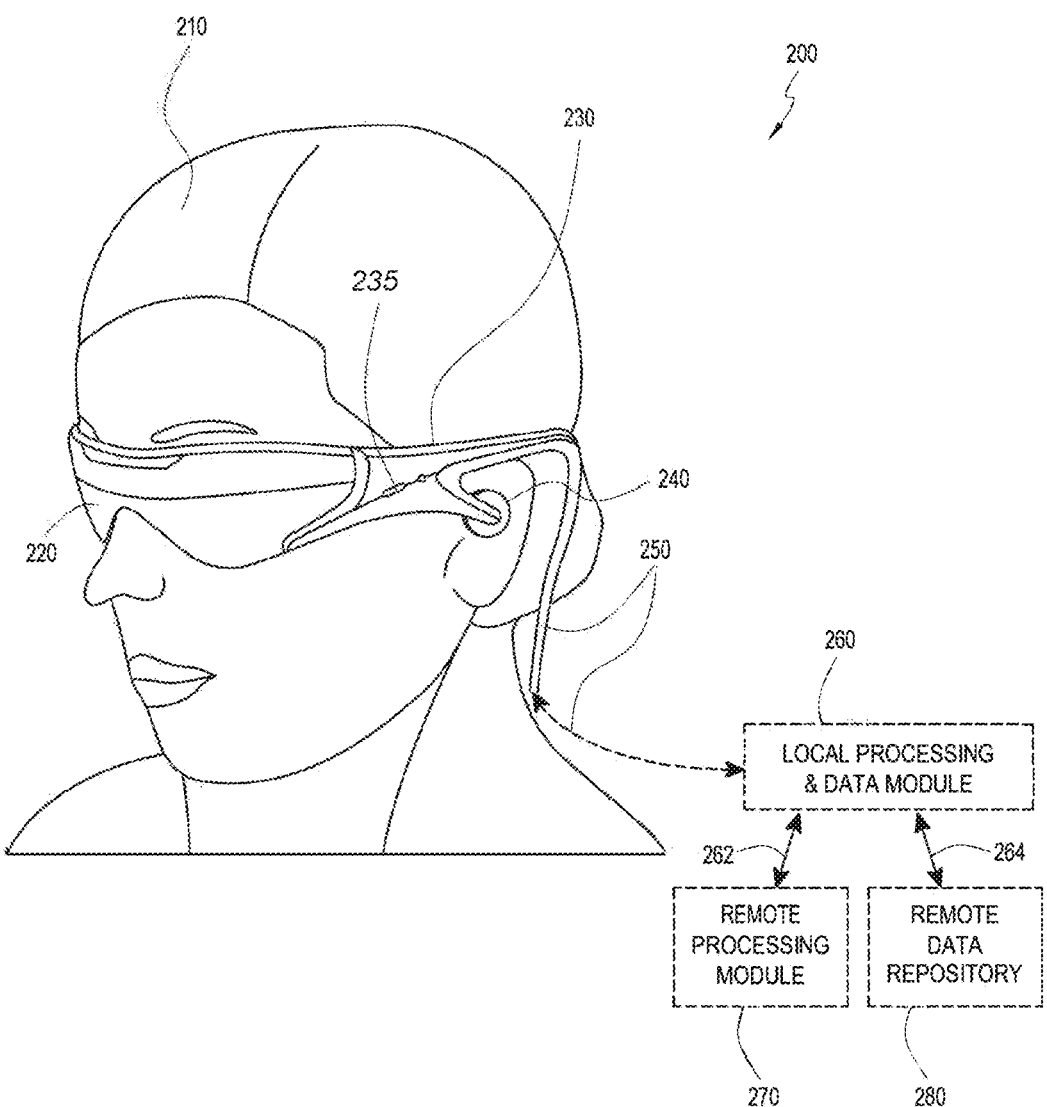
FIG. 2 schematically illustrates an example of a wearable system.

FIG. 2 illustrates an example of wearable system 200. The wearable system 200 can include a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. A portion of the wearable system (such as the display 220) may be worn on the head of the user.

In FIG. 2, a speaker 240 is coupled to the frame 230 and positioned adjacent the ear canal of the user (in some embodiments, another speaker, not shown, is positioned adjacent the other ear canal of the user to provide for stereo/shapeable sound control). The wearable system 200 can also include an outward-facing imaging system 464 (shown in FIG. 4) which observes the world in the environment around the user. The wearable system 100 can also include an inward-facing imaging system 462 (shown in FIG. 4) which can track the eye movements of the user. The inward-facing imaging system may track either one eye's movements or both eyes' movements. The inward-facing imaging system may be attached to the frame 230 and may be in electrical communication with the processing modules 260 and/or 270, which may process image information acquired by the inward-facing imaging system to determine, e.g., the pupil diameters and/or orientations of the eyes or eye pose of the user 210.

As an example, the wearable system 200 can use the outward-facing imaging system 464 and/or the inward-facing imaging system 462 to acquire images of a pose of the user. The pose may be used to determine a user's motion or synthesize an image of the user. The images acquired by the outward-facing imaging system 464 and/or the inward-facing imaging system 462 may be communicated to a second user in a telepresence session to create a tangible sense of the user's presence in the second user environment.

The wearable system 200 can include a head pose sensor 235 that can determine head pose of the user 210. The head pose sensor 235 can comprise an inertial measurement unit (IMU), which may comprise, e.g., an accelerometer, a gyroscope, or a magnetometer (e.g., compass). The head pose sensor 235 may be attached to the frame 230. The head pose sensor 235 can comprise a processor that processes the IMU data or sends the IMU data to the local processing and data module 260 for estimation of head pose. Head pose can be represented as head orientation (e.g., measured by three angles such as yaw, pitch, and roll) and/or head position (e.g., measured by three spatial coordinates such as a Cartesian coordinate system). For example a three degree-of-freedom (DOF) estimate of head pose can comprise a 3DOF orientation (e.g., yaw, pitch, roll), a 3DOF position (e.g., Cartesian x, y, z), or a 6DOF pose that includes both position and orientation (e.g., x, y, z, yaw, pitch, roll). Movement of the user's head can be detected by the head pose sensor 235 and the movement represented as rotation(s) of the orientation angles or translation(s) of the spatial coordinates. In other implementations, the head pose sensor 235 may, additionally or alternatively, include other sensor modalities such as, e.g., components of an electromagnetic tracking system. In some embodiments, the IMU data (e.g., a time series) is processed by filtering (e.g., a Kalman filter or an extended Kalman filter (EKF)) to reduce influence of noise or jitter in the data so as to provide a more accurate estimate of head pose (3DOF or 6DOF). Optionally, the filtering can additionally or alternatively incorporate other sensor data (e.g., camera images, electromagnetic tracking data, etc.) to estimate head pose.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system and/or the outward-facing imaging system), microphones, inertial measurement units (IMUs, 235) (which may comprise, e.g., an accelerometer, a compass, a gyroscope, etc.), global positioning system (GPS) units, radio devices; and/or b) acquired and/or processed using remote processing module 270 and/or remote data repository 280, possibly for passage to the display 220 after such processing or retrieval. The local processing and data module 260 may be operatively coupled by communication links 262 and/or 264, such as via wired or wireless communication links, to the remote processing module 270 and/or remote data repository 280 such that these remote modules are available as resources to the local processing and data module 260. In addition, remote processing module 280 and remote data repository 280 may be operatively coupled to each other. The local processing and data module 260, the remote processing module 270, and the remote data repository 280 may each include a network interface to provide the communication over the communication links 262, 264.

In some embodiments, the remote processing module 270 may comprise one or more hardware processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
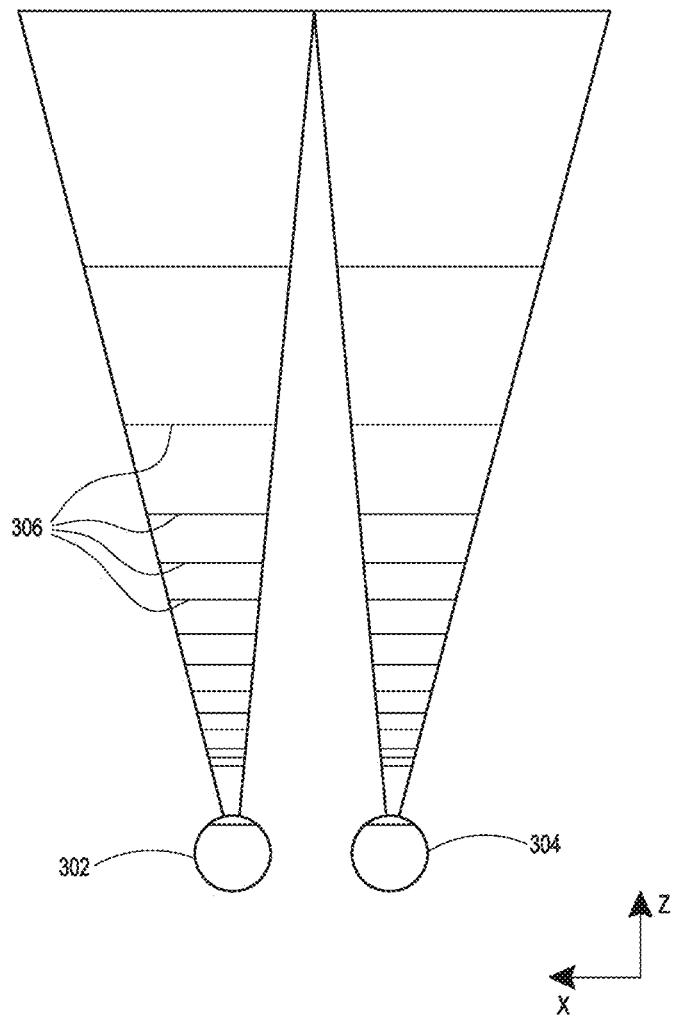
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
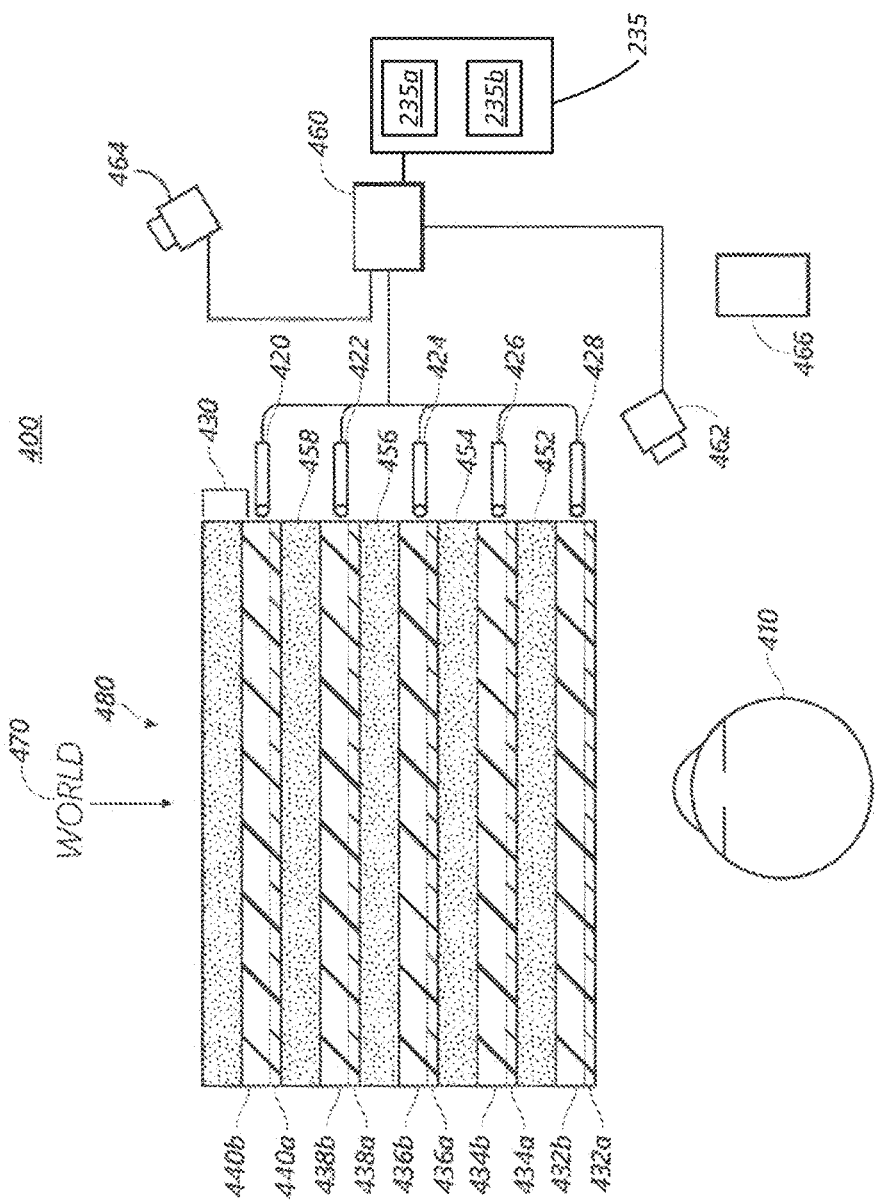
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers and/or structures for forming air gaps).

The waveguides 432b, 434b, 436b, 438b, 440b and/or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., executable instructions stored in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 and/or 270 (illustrated in FIG. 2) in some embodiments. The controller 460 can comprise a hardware processor, application specific integrated circuity (ASIC), or other programmable computer components.

The controller 460 can control rendering of virtual content to be displayed to the user 210. The controller 460 can receive input from the head pose sensor 235 to assist in determining the direction the user 210 is looking toward so as to, in part, determine what virtual content to display and when to display it. For example, as further described herein, it takes a period of time (e.g., about 20 ms to 30 ms in some embodiments) for the controller 460 and the display 220 to render virtual content to the user. The controller 460 can use an estimate of the predicted position of where the user's head will be in the future (e.g., about 20 ms to 30 ms forward in time) so that it can determine what direction the user will be looking at and accordingly what virtual content (in or near that direction) the user should see in the AR/VR/MR environment. The controller 460 can accept head pose sensor data from the head pose sensor 235 and calculate the predicted head pose, or in other embodiments, the head pose sensor 235 (which may comprise an accelerometer 235*a* and a gyroscope 235*b* in some embodiments) may perform the head pose prediction and provide the predicted head pose to the controller 460. Accordingly, in various embodiments, the controller 460, the head pose sensor 235, or the local processing and data module 260 may take head pose data (e.g., from the accelerometer 235*a* or gyroscope 235*b*) and use the recurrent neural network techniques described herein to calculate a predicted head pose (e.g., angular or translational). In some embodiments, the head pose sensor 235 can, additionally or alternatively, include a magnetometer.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective and/or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top and/or bottom major surfaces, and/or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface and/or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE's have a relatively low diffraction efficiency so that only a portion of the light of the beam is deflected away toward the eye 410 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. Depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) and the imaging system 464 is sometimes referred to as an FOV camera. The entire region available for viewing or imaging by a viewer may be referred to as the field of regard (FOR). The FOR may include $4\pi$ steradians of solid angle surrounding the wearable system 400. In some implementations of the wearable system 400, the FOR may include substantially all of the solid angle around a user of the display system 400, because the user can move their head and eyes to look at objects surrounding the user (in front, in back, above, below, or on the sides of the user). Images obtained from the outward-facing imaging system 464 can be used to track gestures made by the user (e.g., hand or finger gestures), detect objects in the world 470 in front of the user, and so forth. The head pose sensor 235 can be used to determine an estimate of head pose, which can be used to estimate the FOV of the user, within the FOR.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 410 (e.g., using only a single camera per pair of eyes) is determined and assumed to be similar for both eyes of the user. The images obtained by the inward-facing imaging system 466 may be analyzed to determine the user's eye pose and/or mood, which can be used by the wearable system 400 to decide which audio or visual content should be presented to the user. As described above, the wearable system 400 may also determine head pose (e.g., head position or head orientation) using, for example, the head pose sensor 235.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem, a smartphone, a smartwatch, a tablet, and so forth, in combination or the like. A multi-DOF controller can sense user input in some or all possible translations (e.g., left/right, forward/backward, or up/down) or rotations (e.g., yaw, pitch, or roll) of the controller. The user can interact with the user input device 466 or objects (e.g., virtual or physical objects) in his or her environment by, e.g., by clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device. The actuation of the user input device 466 may cause the wearable system to perform a user interface operation, such as, e.g., displaying a virtual user interface menu associated with an object, animating the user's avatar in a game, etc. The user input device 466 may be configured to emit light. The light patterns may represent information associated with an object in the user's environment, the user's interaction with the user input device 466 or a wearable device, and so on.

In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400. The user input device 466 may comprise embodiments of the totem described herein. The totem can include a touch surface which can allow a user to actuate the totem by swiping along a trajectory or tapping, etc.

Figure 5:
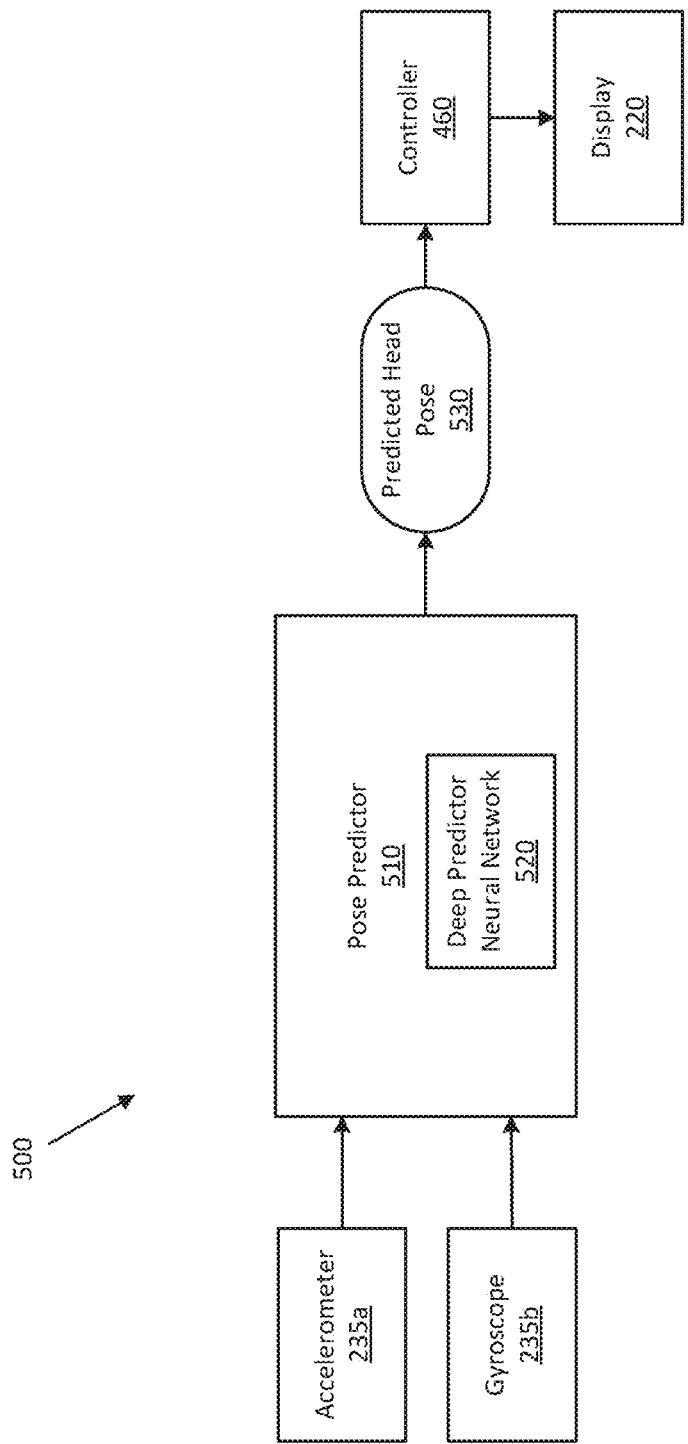
FIG. 5 is a block diagram that schematically illustrates an example of a portion of a rendering pipeline for display of virtual content to a user of a wearable system.

Example Rendering Pipeline with Deep Predictor Neural Network Head Pose Predictor FIG. 5 is a block diagram that schematically illustrates an example of a portion of a rendering pipeline 500 for display of virtual content to a user of a wearable system. The rendering pipeline can be implemented by the wearable system 200 or 400 described with reference to FIGS. 2 and 4, respectively.

In this example, the head pose sensor 235, which provides head pose data, includes an accelerometer 235a and a gyroscope 235b. The head pose data optionally can be filtered, for example, with an extended Kalman filter (EKF) to provide smoother estimates for velocity and acceleration of the user's head. The head pose data is input to a pose predictor 510 that outputs a predicted head pose 530 at a future time horizon. The future time horizon can be comparable to the time it takes the rendering pipeline to generate and display virtual content to the user of the system 200, 400, which may be, e.g., from about 10 ms to about 50 ms in the future. Thus, the rendering pipeline 500 can display the virtual content to the user at the time the user looks toward or near the virtual content, which reduces rendering latency and improves the user experience.

The pose predictor 510 can be implemented by a hardware processor comprising non-transitory memory such as, e.g., the local processing and data module 260, the remote processing module 270 and remote data repository 280, the controller 460, or other electronic computer circuitry.

In various embodiments, the predicted head pose 530 can be a 3DOF head pose comprising head orientation (e.g., yaw, pitch, and roll angles), a 3DOF head pose comprising head position (e.g., Cartesian x, y, and z coordinates), or a 6DOF pose comprising both head orientation and head position.

The predicted head pose 530 is input to the controller 460 (described with reference to FIG. 4) that regulates the timing and provision of virtual content to the display 220 of the wearable system 200, 400.

Figure 6:
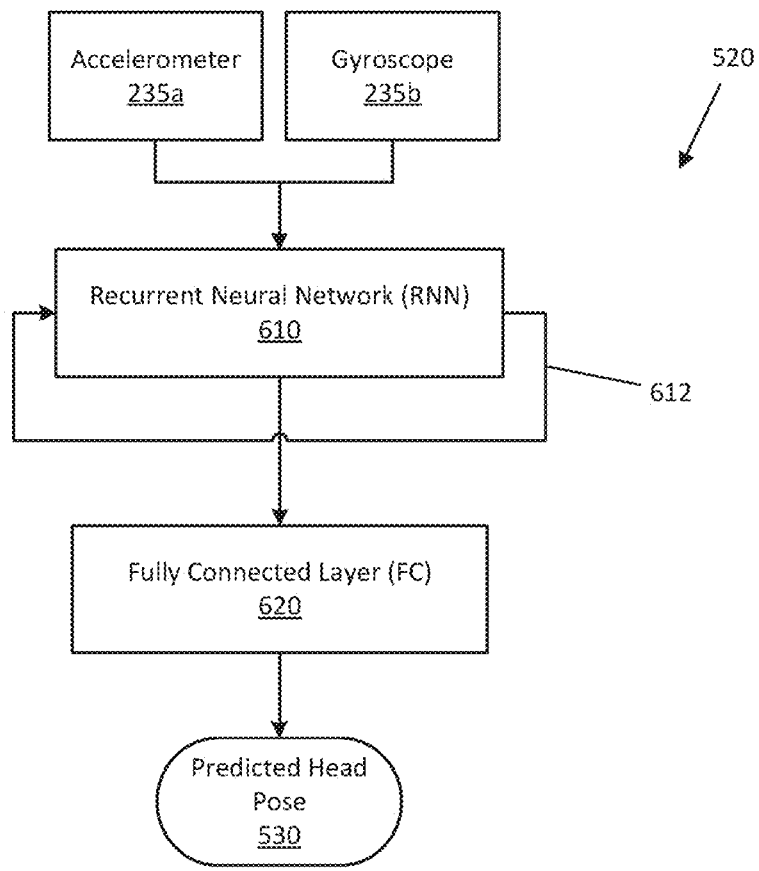
FIG. 6 is a block diagram that schematically illustrates an example of a neural network for head pose prediction. This example of the neural network includes a recurrent neural network (RNN) and a fully connected (FC) layer.
Figure 7:
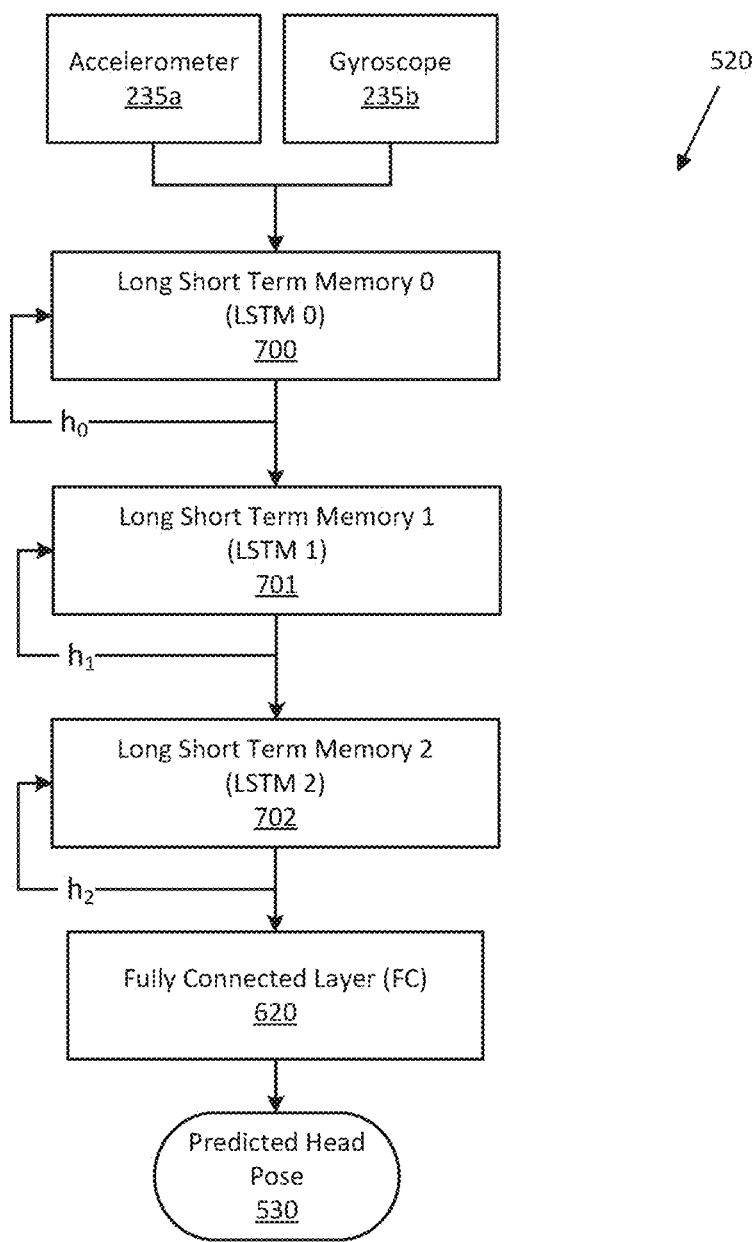
FIG. 7 is a block diagram that schematically illustrates an example of a neural network for head pose prediction. In this example, the neural network includes an RNN that comprises three long short term memory (LSTM) modules connected to an FC layer.

The pose predictor 510 can include embodiments of the Deep Predictor neural network architecture 520 described herein (see, e.g., FIGS. 6 and 7). The Deep Predictor neural network architecture 520 can include a recurrent neural network (RNN), which performs pose prediction more accurately or robustly than a constant acceleration prediction model. In some implementations, the Deep Predictor neural network architecture 520 is used to predict angular orientation of the user's head, and a constant acceleration model is used to predict spatial translation of the user's head.

Example Deep Predictor Neural Network Architectures

FIG. 6 is a block diagram that schematically illustrates an example of the Deep Predictor neural network 520 for head pose prediction. This example of the neural network 520 includes a recurrent neural network (RNN) 610 and a fully connected (FC) layer 620.

As described above, head pose data (e.g., from the accelerometer 235a and gyroscope 235b) can be input to the RNN 610. In some embodiments, the input data comprises raw readings from the head pose sensor 235, additionally or alternatively, with estimates of head velocity and acceleration. For example, the head pose sensor 235 data can be processed by filtering with, e.g., a Kalman or extended Kalman filter, to provide the velocity and acceleration of the user's head. The input head pose data can be a time series over a time period (e.g., 10 ms to 1 s).

The head pose data is input to the RNN 610. An RNN is a neural network with a "memory," because layers of the neural network utilize state information from previous layers of the RNN. RNNs in effect have loops of repeating modules that operate on time series of data, which allows information in the time series to persist (e.g., be remembered) and be acted on by future layers of the RNN. The recurrent nature of the RNN 610 is schematically illustrated by loop 612, which indicates that output from a previous loop can be processed (together with other inputs) at a future loop in the RNN. The RNN 610 thus uses its internal state (e.g., memory) to process the time series head pose data to predict the future head pose 530.

The output of the RNN 610 can be fed to a fully connected (FC) layer 620, which has connections to all the neurons of the final layer of the RNN 610. The FC layer 620 generates the predicted future head pose 530, e.g., 3DOF (angular), 3DOF (translation), or 6DOF (rotation and translation).

In some implementations of the network architecture 520, hidden layers of the RNN 610 include 32 neurons and the FC layer 620 provides 3 (for 3DOF) or 6 (for 6DOF) outputs. In some embodiments, the FC layer 620 includes rectified linear unit (ReLU) or hyperbolic tangent (tanh) activation functions. Other numbers of hidden layer neurons or other types of activation functions can be used. For example, in some implementations, hidden layers of the RNN 610 may include 64 neurons.

FIG. 7 is a block diagram that schematically illustrates another example of the Deep Predictor neural network 520 for head pose prediction. In this example, the neural network architecture includes an RNN that comprises three stacked recurrent neural network units. The recurrent network units are long short term memory (LSTM) networks: LSTM 0 700, LSTM 1 701, and LSTM 2 702. The three LSTM units 700, 701, 702 are stacked, with the output from LSTM 0 700 fed to LSTM 1 701, the output from LSTM 1 701 fed to LSTM 2 702. The recurrent nature of the LSTMs 700, 701, 702 is schematically illustrated with arrows that loop back onto each LSTM unit, with the arrows denoted by $h_0$, $h_1$, $h_2$, respectively, schematically indicating the recurrence and memory of each LSTM unit.

The last of the three LSTM units 702 is connected to the FC layer 620 that provides the predicted head pose 530.

LSTM units are particularly adapted to learning long-term dependencies in a time series of input data (e.g., a time series of head pose data from head pose sensors 235a, 235b). In an example LSTM architecture, an LSTM cell includes a memory cell, an input gate, an output gate, and a forget gate. The memory cell stores a value (or state), for either long or short time periods. This may be achieved by using an identity (or no) activation function for the memory cell. The LSTM gates compute an activation, e.g., using a logistic function. The input gate can controls the extent to which a new value flows into the cell, the forget gate can control the extent to which a value remains in the cell, and the output gate can control the extent to which the value in the cell is used to compute the output activation of the LSTM cell. There can be connections into and out of these gates. Some of the connections can be recurrent. The weights of these connections, which can be learned during training, can be used to direct the operation of the gates. Each of the gates can have its own parameters, e.g., weights and biases, from possibly other units outside the LSTM cell.

In the example network architecture 520 shown in FIG. 7, three stacked LSTM units are used. In some implementations, a single LSTM unit may be used. In other implementations, 2, 4, 5, 6, or more stacked LSTM units can be used. For head pose prediction, experiments with user head pose data showed that three LSTM units provided better performance than one, two, or other numbers of units. For example, increasing the number of LSTM units may increase the ability of the architecture 520 to learn patterns in the head pose time series data, but this increased prediction ability comes at increased computational cost for training and running the network. Three LSTM units were found to provide excellent performance in terms of head pose prediction accuracy and computational efficiency. It is to be understood that different numbers of LSTM units may be employed so as to achieve different objectives. In some examples, fewer LSTM units may be used (e.g., one or two LSTM units), but each LSTM unit employed may include a greater number of neurons, connections, or both. Similar design principles may also be reflected in the architecture of the FC layer.

In other implementations of the Deep Predictor RNN architecture, other types of recurrent units can be used in addition to or instead of the LSTM units shown in FIG. 7. For example, some or all of the LSTM units 700, 701, 702 can be replaced with gated recurrent units (GRUs) or attention units. In yet other implementations, the RNN 610 can comprise a gated feedback RNN, a clockwork (CW) RNN, or any other neural network with memory.

Examples of Training a Deep Predictor Network

An implementation of the Deep Predictor RNN architecture 520 was trained using data gathered from users wearing an embodiment of the wearable display 200, 400. The head pose sensor 235 comprised an IMU operated at 1000 Hz and extended Kalman filtered to provide angular velocity and angular acceleration data at 500 Hz. The number of data points in the head pose time series data was in a range from 10,000 to 100,000 in length. The training data included 126 recordings of user head motion, with 102 recordings used for training and 24 recordings used for validation. The implementation of the Deep Predictor architecture was trained using many-to-many training techniques, with truncated back propagation through time using an L2-norm loss function. Gradients for a number N of past steps were aggregated (with N=200) and optimized while maintaining the hidden state along the sequence.

The trained output pose was 3DOF angular head pose predicted at a 30 ms time horizon for this implementation of the Deep Predictor network. For other time horizons, output from the network 520 can be linearly extrapolated relative to values for the 30 ms time horizon.

Examples of Deep Predictor Network Head Pose Prediction

Figure 8:
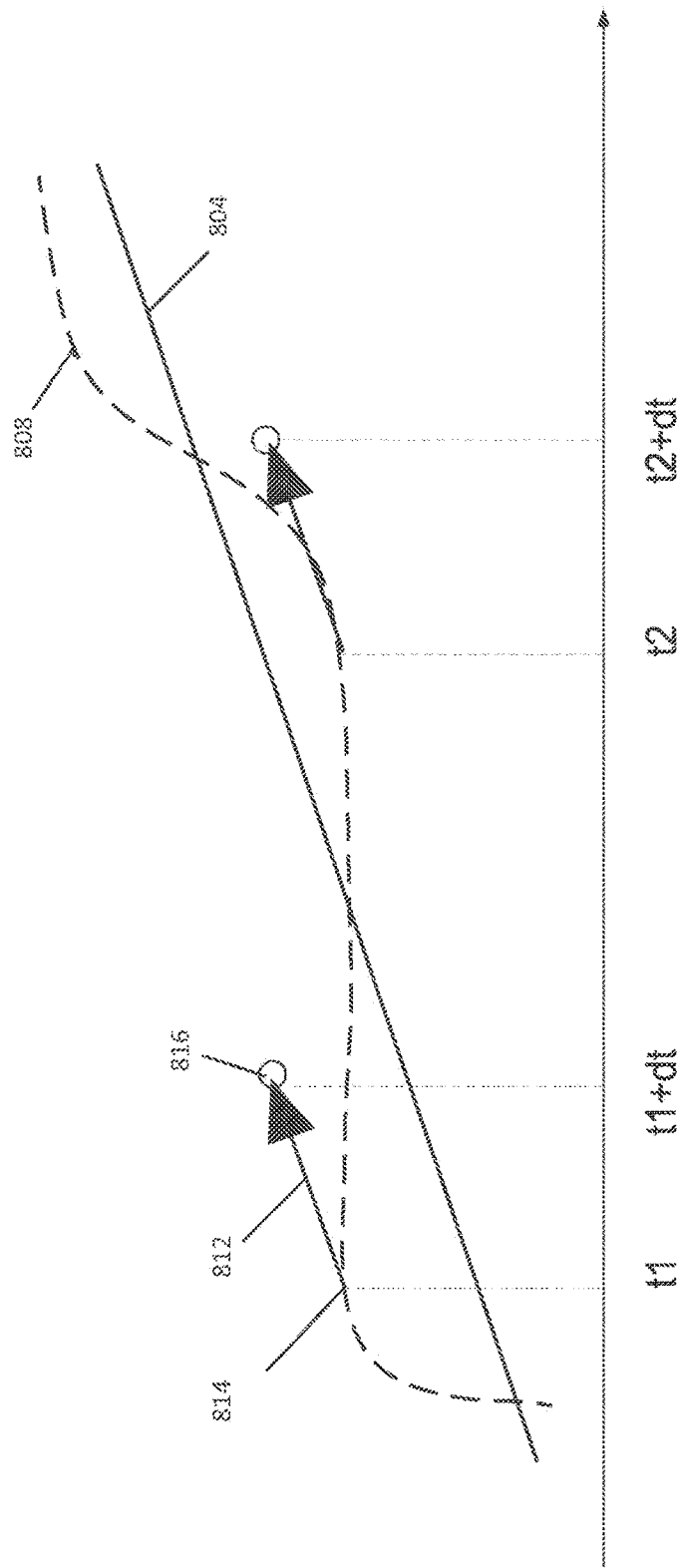
FIG. 8 is a graph that schematically illustrates an example of head pose prediction over a temporal prediction horizon dt.

FIG. 8 is a graph that schematically illustrates an example of head pose prediction over a temporal prediction horizon dt. As described above, the prediction horizon dt can correspond approximately to the rendering latency in the rendering pipeline 500 of the wearable system 200, 400. For example, the prediction horizon dt can be in a range from about 10 ms to about 50 ms, e.g., 30 ms.

In FIG. 8, the user's actual head pose as a function of time is schematically depicted by line 804 (in this case, a straight line for illustrative purposes). The head pose sensor data is schematically illustrated by line 808 and shows variation around the actual head pose line 804 due to noise, jitter, inaccuracies in the EKF filtering, and so forth. At time t1, the head pose sensor data indicates the head pose is at point 814. The pose predictor 510 can utilize the Deep Predictor neural network 520 and a time series of the head pose data (e.g., from the line 808 for a sequences of times prior to time t1) to predict head pose at time t1+dt. The prediction may comprise an angular offset, spatial translation, or both an angular offset and a spatial translation indicated schematically by arrow 812. The pose predictor 510 applies the prediction 812 to the head pose 813 at time t1 to calculate the predicted head pose 816 at the time t1+dt. A similar calculation at time t2 is also illustrated in FIG. 8. The predictions permit the pose predictor 510 to track the actual head pose 804.

Example Methods for Predicting Head Pose Using a Deep Predictor Neural Network

Figure 9:
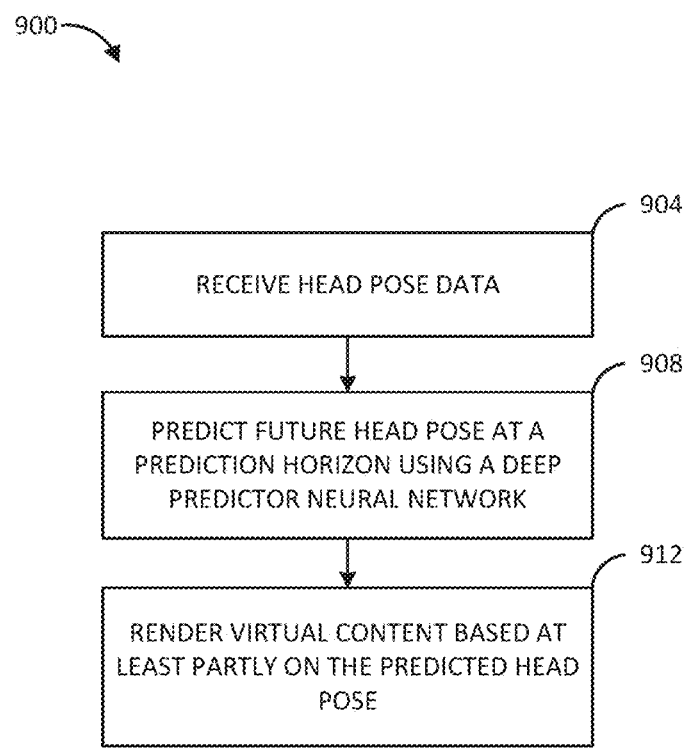
FIG. 9 is a flowchart that illustrates an example of a method for predicting head pose with a recurrent neural network.

FIG. 9 is a flowchart that illustrates an example of a method 900 for predicting head pose with an embodiment of the Deep Predictor neural network architecture 520. The method 900 can be performed by the wearable display system 200, 400, for example, by the local processing and data module 260, the pose predictor 510, the controller 460, or by another hardware processor.

At block 904, the method 900 receives head pose data. For example, the head pose data can comprise data from the head pose sensor 235 (e.g., the accelerometer 235a and the gyroscope 235b). Additionally or alternatively, the head pose data can comprise velocity or acceleration of the user's head. For example, data from the head pose sensor 235 (or other sensors such as an electromagnetic tracking sensor or images from a camera) can be filtered with an extended Kalman filter (EKF) to provide an estimate of the head velocity or acceleration.

At block 908, the method 900 predicts head pose at a future prediction horizon (e.g., from about 10 ms to about 50 ms in the future) using an embodiment of the Deep Predictor neural network architecture 520 (see, e.g., FIGS. 7 and 8). The head pose can be a 3DOF head pose comprising head orientation (e.g., yaw, pitch, and roll angles), a 3DOF head pose comprising head position (e.g., Cartesian x, y, and z coordinates), or a 6DOF pose comprising both head orientation and head position. In some embodiments, the method 900 uses the Deep Predictor neural network architecture 520 to predict angular head pose and uses another prediction model (e.g., constant acceleration) for head translation. The Deep Predictor neural network architecture 520 can comprise an RNN that includes a stack of one or more memory units such as, e.g., LSTM units, GRUs, and so forth. In some implementations, a stack of three LSTM or GRUs is utilized. The Deep Predictor neural network architecture 520 can include an FC layer that accepts the output from the RNN and calculates the predicted head pose.

At block 912, the method 900 utilizes the predicted head pose to render virtual content to the user. For example, the predicted head pose provides information on where the user will be looking at a time period (e.g., 10 ms to 50 ms) in the future. The rendering pipeline 500 can calculate what virtual content the user may be looking toward, and can start the rendering process before the user actual has turned to the predicted pose. Thus, embodiments of the method 900 can reduce rendering latency, provide just-in-time rendering of virtual content, and enable an enjoyable user experience.

Additional Aspects

Aspect 1. A wearable system comprising: a display configured to be disposed before an eye of a wearer of the wearable system, the display configured to display virtual content to the wearer of the wearable system; a head pose sensor configured to provide head pose data; non-transitory memory configured to store a head pose prediction recurrent neural network; a hardware processor in communication with the head pose sensor, the display, and the non-transitory memory, the hardware processor programmed to: receive the head pose data; input the head pose data to the head pose prediction recurrent neural network; execute the head pose prediction recurrent neural network to output a predicted head pose at a time horizon; and cause the display to render the virtual content based at least in part on the predicted head pose at the time horizon.

Aspect 2. The wearable system of aspect 1, wherein the display is configured to present the virtual content at multiple depth planes.

Aspect 3. The wearable system of aspect 1 or aspect 2, wherein the head pose sensor comprises an inertial measurement unit.

Aspect 4. The wearable system of aspect 3, wherein the inertial measurement unit comprises an accelerometer and a gyroscope.

Aspect 5. The wearable system of any one of aspects 1 to 4, wherein the head pose data comprises a velocity or an acceleration.

Aspect 6. The wearable system of aspect 5, wherein output from the head pose sensor is filtered by an extended Kalman filter to provide the head pose data.

Aspect 7. The wearable system of any one of aspects 1 to 6, wherein the head pose prediction recurrent neural network comprises a recurrent neural network (RNN) and a fully connected (FC) layer.

Aspect 8. The wearable system of any one of aspects 1 to 7, wherein the head pose prediction recurrent neural network comprises a plurality of repeating modules.

Aspect 9. The wearable system of aspect 8, wherein at least one of the plurality of repeating modules comprises a long short term memory cell (LSTM) or a gated recurrent unit (GRU).

Aspect 10. The wearable system of any one of aspects 1 to 9, wherein the head pose prediction recurrent neural network comprises a stack of one or more long short term memory (LSTM) cells or a stack of one or more gated recurrent units (GRUs).

Aspect 11. The wearable system of aspect 10, wherein the head pose prediction recurrent neural network comprises three LSTM cells or three GRUs.

Aspect 12. The wearable system of any one of aspects 1 to 11, wherein the time horizon is in a range from 10 ms to 50 ms.

Aspect 13. The wearable system of any one of aspects 1 to 11, wherein the time horizon is in a range from 20 ms to 40 ms.

Aspect 14. The wearable system of any one of aspects 1 to 13, wherein the predicted head pose comprises a 3 degree-of-freedom (DOF) pose.

Aspect 15. The wearable system of aspect 14, wherein the 3DOF pose comprises head orientation.

Aspect 16. The wearable system of aspect 14 or aspect 15, wherein the 3DOF pose comprises head position.

Aspect 17. The wearable system of any one of aspects 1 to 16, wherein the predicted head pose comprises a 6 degree-of-freedom (DOF) pose comprising orientation and position.

Aspect 18. The wearable system of any one of aspects 1 to 17, wherein the predicted head pose comprises head orientation, and the hardware processor is further programmed to predict head position at the time horizon using a predictive, non-neural network model.

Aspect 19. The wearable system of aspect 18, wherein the predictive, non-neural network model comprises a constant acceleration model.

Aspect 20. A method for rendering virtual content, the method comprising: under control of a rendering pipeline comprising computer hardware: receiving head pose data for a head of a user; predicting, using at least a recurrent neural network (RNN) and the head pose data, a predicted head pose at a prediction horizon; and rendering the virtual content at the prediction horizon based at least partly on the predicted head pose.

Aspect 21. The method of aspect 20, wherein the head pose data comprises a time series of one or more of: (1) data from an inertial measurement unit (IMU), (2) velocity or acceleration data for the head of the user, or both (1) and (2).

Aspect 22. The method of aspect 21, further comprising filtering data to provide the velocity or acceleration data.

Aspect 23. The method of aspect 22, wherein the filtering is performed with an extended Kalman filter (EKF).

Aspect 24. The method of any one of aspects 20 to 23, wherein the RNN comprises a stack of one or more long short term memory (LSTM) cells or a stack of one or more gated recurrent units (GRUs).

Aspect 25. The method of aspect 24, wherein the RNN comprises a stack of three LSTM cells or three GRUs.

Aspect 26. The method of any one of aspects 20 to 25, wherein the RNN is connected to a fully connected (FC) layer configured to output the predicted head pose.

Aspect 27. The method of any one of aspects 20 to 26, wherein the predicted head pose comprises an orientation of the head of the user, and the method further comprises predicting, at the prediction horizon, a position of the head of the user with a constant acceleration model.

Aspect 28. The method of any one of aspects 20 to 27, wherein the prediction horizon is in a range from 10 ms to 50 ms.

Aspect 29. A wearable display system comprising a display configured to be disposed before an eye of a wearer of the wearable system, the display configured to display virtual content to the wearer of the wearable system; a head pose sensor configured to provide head pose data; non-transitory memory configured to store a head pose prediction recurrent neural network; computing hardware in communication with the head pose sensor, the display, and the non-transitory memory, the computing hardware programmed to include a rendering pipeline programmed to perform the method of any one of aspects 20 to 28.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Further, head pose may be repeatedly be predicted on a timescale of 20 ms to 50 ms (e.g., 20 Hz to 50 Hz) so that the rendering engine of a wearable system can render virtual content that provides sufficiently low latency for a satisfactory user experience, and hardware processing circuitry may be required to perform the recurrent neural network head pose predictions described herein.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, a satellite network, the Internet, and the World Wide Web. The network may be a wired or a wireless network or any other type of communication network.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Elements, actions, steps or blocks of methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system comprising:
    a display configured to be disposed before an eye of a wearer of the wearable system, the display configured to display virtual content to the wearer of the wearable system;
    non-transitory memory configured to store a head pose neural network; and
    a hardware processor programmed to:
        determine particular virtual content configured for display at a head pose of the wearer predicted for an upcoming time, the head pose being predicted based on sensor information associated with the display and the head pose prediction neural network; and
        cause rendering of the particular virtual content, wherein rendering is configured to be completed when the display is associated with the head pose, and wherein the upcoming time is a time associated with rendering latency.

2. The system of claim 1, wherein the sensor information is obtained via an inertial measurement unit.

3. The system of claim 1, wherein the head pose prediction network is a neural network comprising a recurrent neural network.

4. The system of claim 3, wherein the recurrent neural network is connected to a fully connected layer.

5. The system of claim 4, wherein the fully connected layer outputs a 3 degree-of-freedom (DOF) pose or a 6 degree-of-freedom (DOF) pose.

6. The system of claim 3, wherein the recurrent neural network comprises a stack of one or more long short term memory cells or a stack of one or more gated recurrent units.

7. The system of claim 1, wherein the sensor data is filtered using an extended Kalman filter.

8. The system of claim 1, wherein the head pose comprises an orientation of the head of the user, and wherein rendering is configured to be completed when the display is associated with the orientation.

9. A method implemented by a wearable system comprising a display configured to be disposed before an eye of a wearer of the wearable system, the display configured to display virtual content to the wearer of the wearable system, wherein the method comprises:
    determine particular virtual content configured for display at a head pose of the wearer predicted for an upcoming time, the head pose being predicted based on sensor information associated with the display and the head pose prediction neural network; and
    cause rendering of the particular virtual content, wherein rendering is configured to be completed when the display is associated with the head pose, and wherein the upcoming time is a time associated with rendering latency.

10. The method of claim 9, wherein the sensor information is obtained via an inertial measurement unit.

11. The method of claim 9, wherein the head pose prediction network is a neural network comprising a recurrent neural network.

12. The method of claim 11, wherein the recurrent neural network is connected to a fully connected layer.

13. The method of claim 12, wherein the fully connected layer outputs a 3 degree-of-freedom (DOF) pose or a 6 degree-of-freedom (DOF) pose.

14. The method of claim 11, wherein the recurrent neural network comprises a stack of one or more long short term memory cells or a stack of one or more gated recurrent units.

15. The method of claim 9, wherein the sensor data is filtered using an extended Kalman filter.

16. The method of claim 9, wherein the head pose comprises an orientation of the head of the user, and wherein rendering is configured to be completed when the display is associated with the orientation.

* * * * *